United States Patent [19]
Ueno et al.

[11] Patent Number: 6,166,875
[45] Date of Patent: Dec. 26, 2000

[54] METHOD OF POSITIONALLY CONTROLLING A RECORDING/REPRODUCING HEAD SO AS TO FOLLOW A ROTATIONAL FREQUENCY COMPONENT OF A DISK WHILE ELIMINATING A HIGH ORDER FREQUENCY COMPONENT

[75] Inventors: Takahisa Ueno; Kazuhiko Takaishi, both of Kawasaki, Japan

[73] Assignee: Fujitsu Limited, Kawasaki, Japan

[21] Appl. No.: 09/067,168

[22] Filed: Apr. 27, 1998

[30] Foreign Application Priority Data

Oct. 20, 1997 [JP] Japan .................................... 9-287325

[51] Int. Cl.[7] .................................................. G11B 5/596
[52] U.S. Cl. ...................................... 360/77.04; 360/78.14
[58] Field of Search ............................ 360/77.02, 77.04, 360/77.06, 75, 78.14

[56] References Cited

U.S. PATENT DOCUMENTS

| | | | |
|---|---|---|---|
| 4,764,860 | 8/1988 | Takao ............................... | 360/77.02 X |
| 4,954,905 | 9/1990 | Wakabashi et al. ................. | 360/77.03 |
| 5,305,159 | 4/1994 | Sakai et al. ....................... | 360/77.08 X |
| 5,402,400 | 3/1995 | Hamada et al. .................. | 360/77.04 X |
| 5,550,685 | 8/1996 | Drouin ................................ | 360/77.08 |

FOREIGN PATENT DOCUMENTS 9042948   2/1997   Japan .

*Primary Examiner*—Andrew L. Sniezek
*Attorney, Agent, or Firm*—Greer, Burns & Crain, Ltd.

[57] ABSTRACT

A disk device includes a magnetic disk carrying servo information and rotatable about a rotational axis, a magnetic head for reading information from the magnetic disk, a positioning unit for positioning the magnetic head radially over the magnetic disk, and a control unit for controlling the positioning unit according to the servo information. The control unit separately measures a rotational frequency component of the magnetic disk and a high-order frequency component which has frequencies higher than the rotational frequency component, and thereafter controls the positioning unit so as to follow the rotational frequency component while eliminating the high-order frequency component. When the magnetic head is positioned along a circular pattern about the rotational axis of the magnetic disk, the magnetic head is prevented from vibrating while compensating for an eccentricity of the magnetic disk.

19 Claims, 13 Drawing Sheets

METHOD OF POSITIONALLY CONTROLLING A RECORDING/REPRODUCING HEAD SO AS TO FOLLOW A ROTATIONAL FREQUENCY COMPONENT OF A DISK WHILE ELIMINATING A HIGH ORDER FREQUENCY COMPONENT

BACKGROUND OF THE INVENTION

1. Field of the Invention

The present invention relates to a method of positionally controlling a recording/reproducing head over tracks of a recording disk and a disk apparatus which is controlled by such a method, and more particularly to a method of positionally controlling a recording/reproducing head along circular patterns on a recording disk around the axis of rotation thereof and a disk apparatus which is controlled by such a method.

2. Description of the Related Art

As well known in the art, there are ever-increasing demands for magnetic disk drives with greater storage capacity. In order to increase the storage capacity of magnetic disk drives, it is necessary to reduce the pitch of tracks, i.e., track-to-track distances, of magnetic disks. Reducing the track pitch requires tracks having servo information, i.e., servo tracks, to be written accurately in position on magnetic disks. It has been desired in the art to manufacture inexpensive magnetic disk drives with accurate servo tracks on magnetic disks.

FIG. 13 of the accompanying drawings illustrates how a servo track deflects to an eccentric position with respect to a circular pattern around the axis of rotation of a magnetic disk. FIG. 14 of the accompanying drawings illustrates the manner in which a track deviates from a circular pattern on a magnetic disk. FIG. 15 of the accompanying drawings shows a conventional magnetic disk drive for controlling the position of a magnetic head.

In order to write servo tracks accurately in position on magnetic disks, it has heretofore been necessary to provide individual magnetic disk drives with a function to write servo tracks accurately in position on the magnetic disks. However, magnetic disk drives with such a function are relatively expensive to manufacture.

To avoid such a drawback, it has been proposed to write servo tracks on magnetic disks with a servo track writer, and thereafter install those magnetic disks in individual magnetic disk drives.

Specifically, servo tracks are written on magnetic disks by a servo track writer having a high positioning accuracy. Then, the magnetic disks with the servo tracks written thereon are installed respectively in individual magnetic disk drives. This process eliminates the need for providing individual magnetic disk drives with a function to write servo tracks accurately in position on the magnetic disks. Consequently, it is possible to manufacture inexpensively magnetic disk drives having servo tracks with a small track pitch.

When a magnetic disk with a servo track written thereon is installed in a magnetic disk drive, as shown in FIG. 13, a circular servo track 14-1 carrying servo information on a magnetic disk 14 may be positioned out of alignment with a circular pattern 14-2 around the axis of rotation of the magnetic disk 14. Specifically, since the magnetic disk 14 with the circular servo track 14-1 written thereon is subsequently installed in the magnetic disk drive, the circular servo track 14-1 is often not aligned with the circular pattern 14-2 even in the presence of a small installation error.

The magnetic disk 14 is liable to deflect to an eccentric position because of such an installation error of the magnetic disk 14. As shown in FIG. 13, a magnetic head 13 supported on an arm 17 moves radially over the magnetic disk 14. The magnetic head 13 positioned along the circular pattern 14-2 on the magnetic disk 14 is controlled by the servo information carried by the servo track 14-1, and positioned along the servo track 14-1.

As shown in FIG. 14, the servo track 14-1 suffers a track deviation from the circular pattern 14-2 on the magnetic disk 14, the track deviation containing an eccentric deflection. Since the track deviation contains an eccentric deflection, the magnetic head 13 is subjected to a large positional error, and hence is likely to vibrate during operation of the magnetic disk drive.

Efforts have been made to apply an eccentric control process to eliminate the above shortcoming. According to such an eccentric control process, as shown in FIG. 15, a magnetic disk drive 12 has a magnetic disk 14 and a spindle motor 15 for rotating the magnetic disk 14. A magnetic head 13 is mounted on the distal end of an arm 17 which is movable by a rotary actuator (VCM) 10 for positioning the magnetic head 13 radially over the magnetic disk 14.

A head position detector 20 detects the position of the magnetic head 13 from a signal read from the magnetic disk 14 by the magnetic head 13. A control processor 25 effects a control process (e.g., PID operation) on a positional error to calculate a control current. The control current is amplified by an amplifier 23, and supplied to energize the VCM 10.

While the arm 17 is being fixed, the magnetic head 13 reads servo information from the magnetic disk 14 and measures a positional error. A positional error, i.e., the track deviation shown in FIG. 14, for one revolution of the magnetic disk 14 is read, and stored in a memory 22. In a normal control mode, the track deviation stored in the memory 22 is added to the positional error from the magnetic head 13 for controlling the VCM 10.

In this manner, an eccentric component (track deviation) is measured to control the magnetic head 13 according to a feedforward control process. Therefore, the magnetic head 13 is positioned along a circular pattern on the magnetic disk 14, thus minimizing the positional error.

As described above, it has been customary to measure a track deviation and effect a feedforward control process to eliminate the measured track deviation for thereby positioning the magnetic head 13 along the circular pattern on the magnetic disk 14.

FIGS. 16 and 17 of the accompanying drawings illustrate problems with the conventional eccentric control process.

If the track pitch is reduced, the magnitude of the core width of the magnetic head affects a demodulated output signal. Since there is a certain limit to efforts to reduce the core width of the magnetic head, the detecting area of the magnetic head exhibits sensitivity variations.

Because of such sensitivity variations, a demodulation displacement is not linear with respect to a head displacement, as shown in FIG. 16. Specifically, when the magnetic head is positioned at a track boundary, the servo demodulation displacement is discontinuous. This is because the detecting area of the magnetic head exhibits sensitivity variations if the track pitch is reduced.

In the case where read and write heads separate from each other, such as of an MR head assembly, are employed, the magnetic head is offset in position in order to compensate for the difference between core positions of the read and write heads. With the magnetic head being thus offset, the magnetic head tends to be easily positioned at a track boundary. Discontinuous regions of the servo demodulation displacement exhibit a high-frequency positional error. When a feedforward control process is effected to eliminate a track deviation, an eccentric component is compensated for, but a high-frequency component is emphasized, as shown in FIG. 17. Therefore, the magnetic head vibrates across the center of the track, as shown in FIG. 17. Consequently, the magnetic head tends to vibrate excessively, and its positioning accuracy is lowered.

SUMMARY OF THE INVENTION

It is an object of the present invention to provide a method of positionally controlling a magnetic head over a magnetic disk with high accuracy while compensating for an eccentricity of the magnetic disk, and a magnetic disk apparatus which is controlled by such a method.

Another object of the present invention is to provide a method of positionally controlling a magnetic head over a magnetic disk to prevent the magnetic head from vibrating while compensating for an eccentricity of the magnetic disk, and a magnetic disk apparatus which is controlled by such a method.

Still another object of the present invention is to provide a method of positionally controlling a magnetic head over a magnetic disk to eliminate high-order frequency components of a positional error while compensating for an eccentricity of the magnetic disk, and a magnetic disk apparatus which is controlled by such a method.

According to the present invention, a magnetic disk apparatus has a magnetic disk carrying servo information and rotatable about a rotational axis, a magnetic head for reading information from the magnetic disk, positioning means for positioning the magnetic head radially over the magnetic disk, and control means for controlling the positioning means according to the servo information.

A method of positionally controlling the magnetic head comprises the steps of separately measuring a rotational frequency component of the magnetic disk and a high-order frequency component which has frequencies higher than the rotational frequency component, and controlling the positioning means so as to follow the rotational frequency component while eliminating the high-order frequency component.

The control means comprises means for separately measuring a rotational frequency component of the magnetic disk and a high-order frequency component which has frequencies higher than the rotational frequency component, and thereafter controlling the positioning means so as to follow the rotational frequency component while eliminating the high-order frequency component.

Since the magnetic head is controlled so as to follow the rotational frequency component, an eccentricity of the magnetic disk can accurately be compensated for.

Because the magnetic head is controlled while eliminating a high-order frequency component at a discontinuous region of a servo demodulation displacement, the magnetic head is prevented from vibrating at a track boundary.

Inasmuch as a rotational frequency component and a high-order frequency component are measured separately from each other, the magnetic head can be controlled to follow the rotational frequency component accurately while eliminating the high-order frequency component. Therefore, the magnetic head can be controlled to follow the eccentricity of the magnetic disk with high positioning accuracy.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
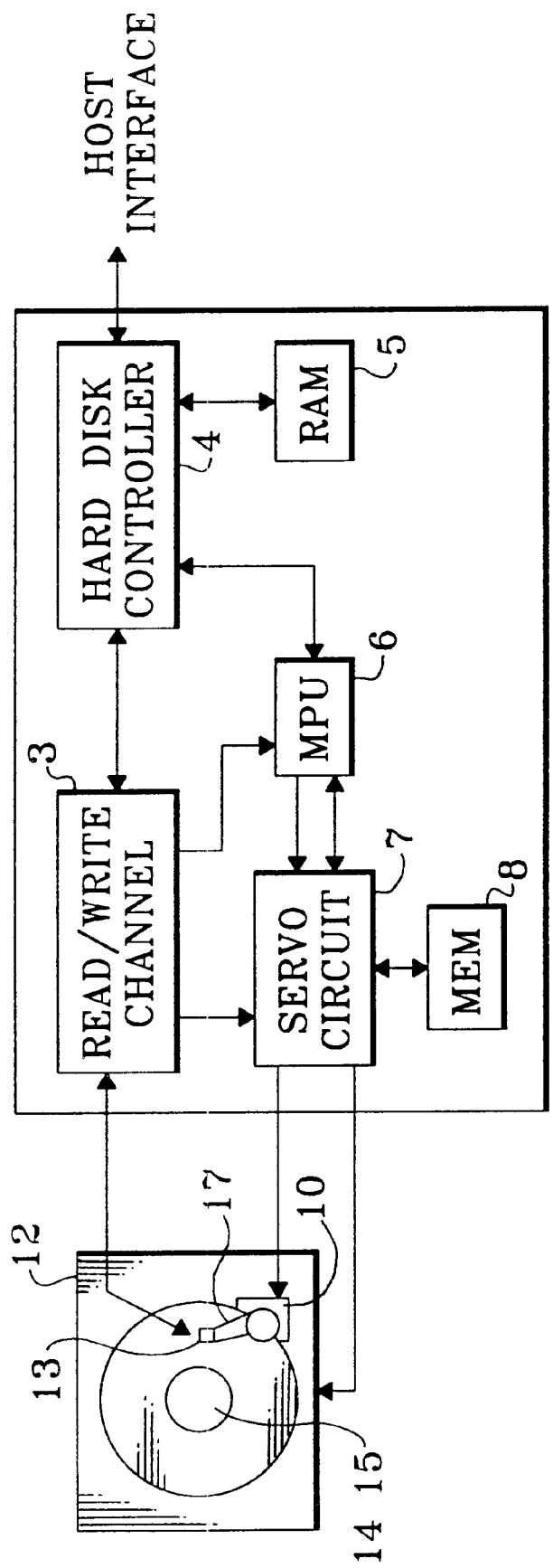
FIG. 1 is a plan view, partly in block form, of a magnetic disk device according to an embodiment of the present invention.
Figure 4:
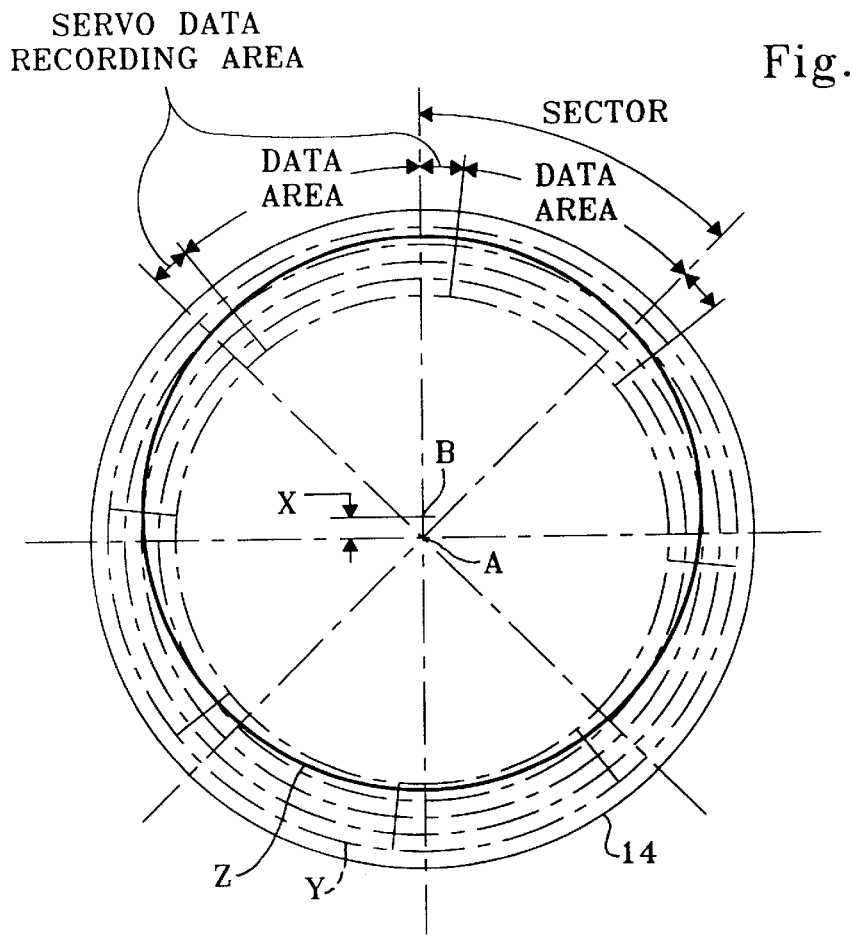
FIG. 4 is a diagram illustrative of a control process of the servo circuit shown in FIG. 2.

As shown in FIG. 1, a magnetic disk device according to an embodiment of the present invention includes a magnetic disk drive 12 having a magnetic disk 14 and a spindle motor 15 for rotating the magnetic disk 14. Actually, a plurality of magnetic disks 14 are mounted on the shaft of the spindle motor 15. As shown in FIG. 4, the magnetic disk 14 has a servo track Y written thereon.

The servo track Y is divided into a plurality of (e.g., 128) sectors. Each of the sectors has a servo area in which servo information is written and a data area in which data is written. After servo information has been written, the magnetic disks 14 are mounted on the shaft of the spindle motor 15. Because of an eccentricity of the magnetic disk 14, the servo track Y has a circular pattern different from a circular pattern Z around the center of rotation of the magnetic disk 14, as shown in FIG. 4.

As shown in FIG. 1, a magnetic head 13 is mounted on the distal end of an arm 17 which is movable by a rotary actuator (VCM) 10 for positioning the magnetic head 13 radially over the magnetic disk 14.

A read/write channel 3 serves to read detected data from the magnetic head 13 and convert the read data into a signal, and also converts data to be written into a write signal to be supplied to the magnetic head 13. A hard disk controller 4 controls the transfer of data to and from a host. A RAM 5 is a memory used by the hard disk controller 4.

A microprocessor (MPU) 6 serves to control the magnetic disk device in its entirety. A servo circuit 7 comprises a digital signal processor (DSP), and controls the VCM 10 with a servo loop in response to a position signal from the magnetic head 13, and also controls the rotation of the spindle motor 15.

A memory 8 stores eccentric data at predetermined times of the magnetic disk 14 during one revolution thereof. The eccentric data stored in the memory 8 is supplied to the servo circuit 7.

Figure 2:
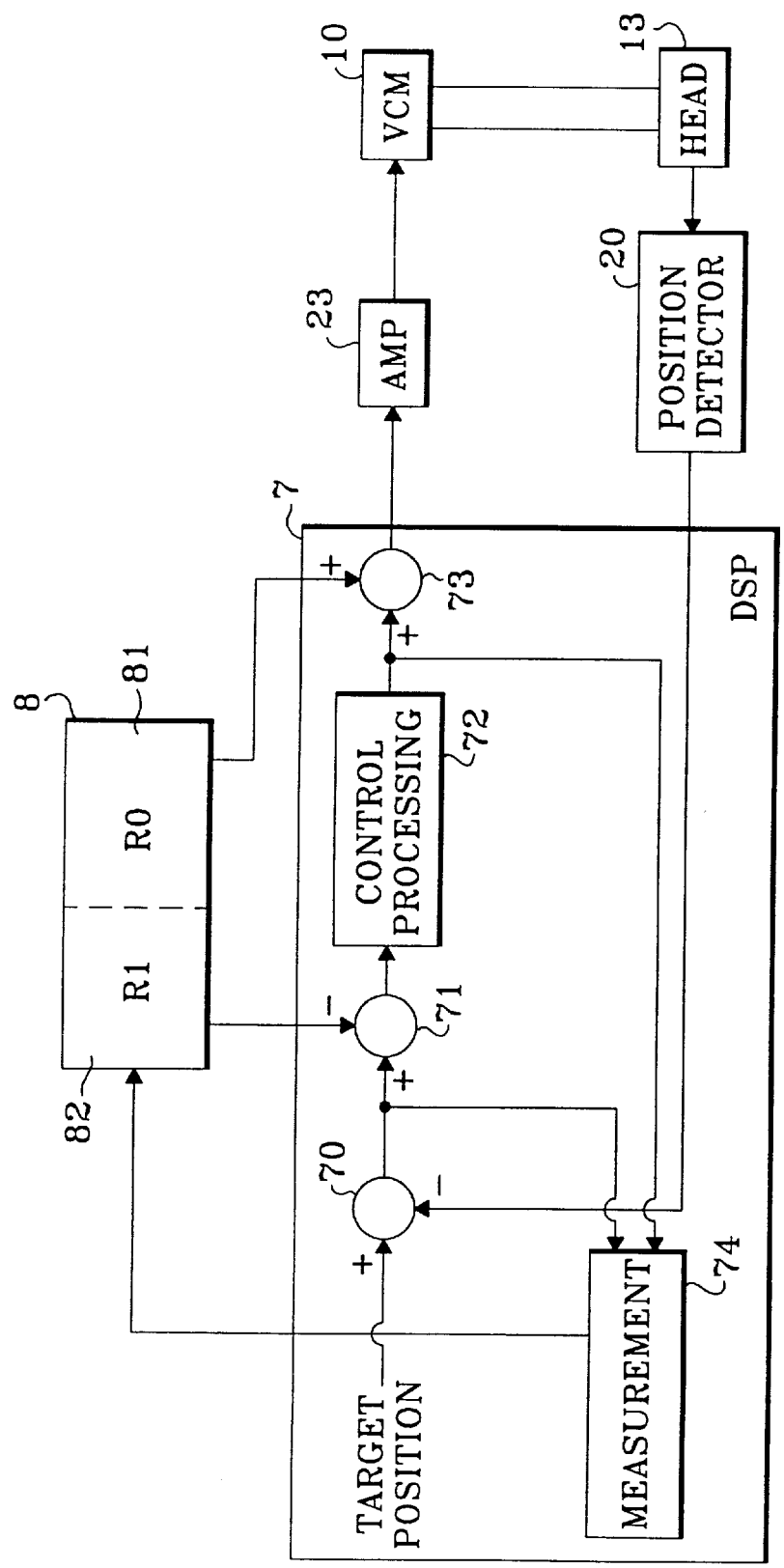
FIG. 2 is a block diagram of a servo circuit and related circuits of the magnetic disk device shown in FIG. 1.

As shown in FIG. 2, a position signal detector 20 detects a head position from a signal that is read by the magnetic head 13. An amplifier 23 amplifies a control current from the DSP 7 and applies the amplified control current to energize the VCM 10. An input block of the amplifier 23 converts an digital code from the DSP 7 that is the control current into an analog signal.

The memory 8 also stores an eccentric component R0 and a high-frequency deviation component R1. The eccentric component R0 is a rotational frequency component produced by the rotation of the magnetic disk 14, and is stored in a first area 81 of the memory 8. The high-frequency deviation component R1 is a frequency component which is of frequencies higher than the eccentric component R0, and is stored in a second area 82 of the memory 8.

The DSP 7 has a first processing unit 70 which subtracts a detected position from a target position thereby to calculate a positional error. The DSP 7 also has a second processing unit 71 which subtracts the high-frequency deviation component R1 stored in the memory 8 from the positional error. Thus, the high-frequency deviation component R1 is eliminated from a control system including the DSP 7. A control processing unit 72 effects a control process (e.g., PID operation) on the positional error from which the high-frequency deviation component R1 has been subtracted, thereby to calculate a control current. A third processing unit 73 adds the eccentric component R0 stored in the memory 8 to the control current. Therefore, the magnetic head 13 is controlled to follow the eccentric component R0.

The DSP 7 has a measuring unit 74 for measuring the eccentric component R0 from the control current and storing the measured eccentric component R0 in the first area 81 of the memory 8. The measuring unit 74 also serves to measure the high-frequency deviation component R1 from the positional error and the control current, and stores the measured high-frequency deviation component R1 in the second area 82 of the memory 8.

The first processing unit 70, the second processing unit 71, the third processing unit 73, the control processing unit 72, and the measuring unit 74, which are represented by respective blocks in FIG. 2, are actually functions performed by the DSP 7.

Figure 3:
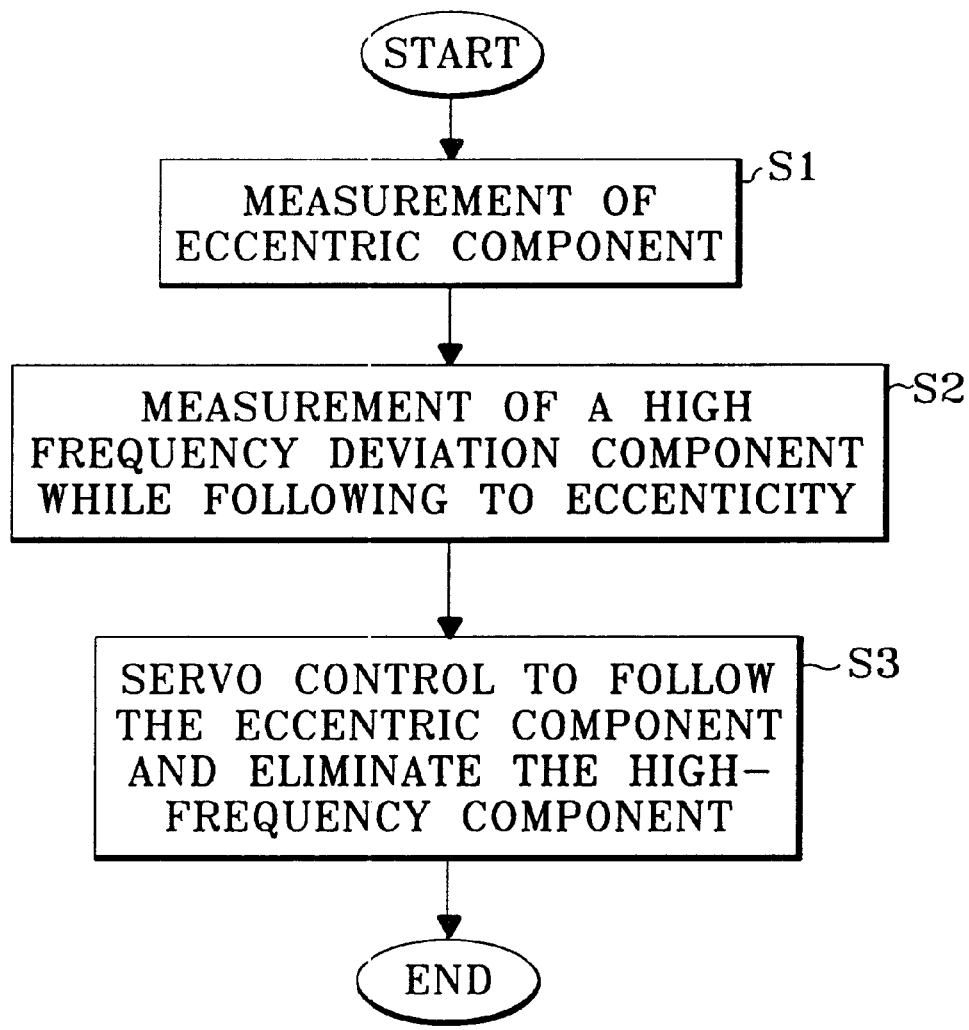
FIG. 3 is a flowchart of an operation sequence of the servo circuit shown in FIG. 2.

An operation sequence of the DSP 7 will be described below with reference to FIG. 3. In FIG. 3, reference numerals with a prefix S represent step numbers.

(S1) The measuring unit 74 measures an eccentric component R0 from the control current while following the positional error, and stores measured eccentric component R0 in the first area 81 of the memory 8.

(S2) The measuring unit 74 measures a high-frequency deviation component Ri from the positional error and the control current while following the eccentric component, and stores the measured high-frequency deviation component R1 in the second area 82 of the memory 8.

(S3) The DSP 7 follows the eccentric component R0, eliminates the high-frequency deviation component R1, and controls the magnetic head 13 with a servo loop. Specifically, the first processing unit 70 subtracts a detected position from a target position thereby to calculate a positional error. The second processing unit 71 subtracts the high-frequency deviation component R1 stored in the memory 8 from the positional error. Thus, the high-frequency deviation component R1 is eliminated from the entire operation of the DSP 7. The control processing unit 72 effects a control process (e.g., PID operation) on the positional error from which the high-frequency deviation component RI has been subtracted, thereby to calculate a control current. The third processing unit 73 adds the eccentric component R0 stored in the memory 8 to the control current. The control current to which the eccentric component R0 is added is supplied to the amplifier 23, which amplifies the control current and applies the amplified control current to energize the VCM 10.

Since the magnetic head 13 is controlled in a manner to follow the eccentric component R0, the magnetic head 13 is positionally controlled to move along the circular pattern Z. Therefore, even if the magnetic disk 14 is eccentric, a positional error of the magnetic head 13 is reduced, and the magnetic head 13 is positionally controlled stably.

Figure 5:
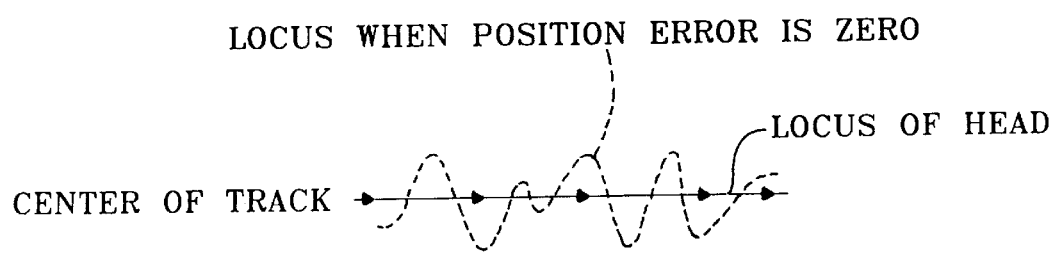
FIG. 5 is a diagram illustrative of a high-order eccentric compensating process of the servo circuit shown in FIG. 2.

A demodulation displacement at a track boundary is discontinuous, producing a high-order frequency component. Since the high-frequency deviation component R1 which is the high-order frequency component is eliminated, a transient response of the magnetic head 13 due to high-order frequencies is avoided. Consequently, as shown in FIG. 5, the magnetic head 13 is prevented from vibrating across the track.

In this embodiment, the eccentric component is added to the control current. According to another control process, the eccentric component would be added to the positional error. However, since the positional error would be compressed in operations effected by the control processing unit 72, the magnetic head 13 could not follow the eccentric component accurately. According to this embodiment, however, inasmuch as the eccentric component is added to the control current after the control current is compressed, the magnetic head 13 can be controlled to follow the eccentric component directly even if the eccentric component is of a large magnitude.

According to this embodiment, furthermore, the high-frequency deviation component is measured while following the measured eccentric component. Because the high-frequency deviation component is measured from the positional error from which the eccentric component is removed, the high-frequency deviation component can be measured with accuracy.

In addition, the high-frequency deviation component is eliminated from the positional error. Since the high-frequency deviation component is eliminated at an input stage of the control system, the high-frequency deviation component will not adversely affect the control system.

A process of measuring an eccentric component will be described below with reference to FIGS. 6 and 7.

Figure 6:
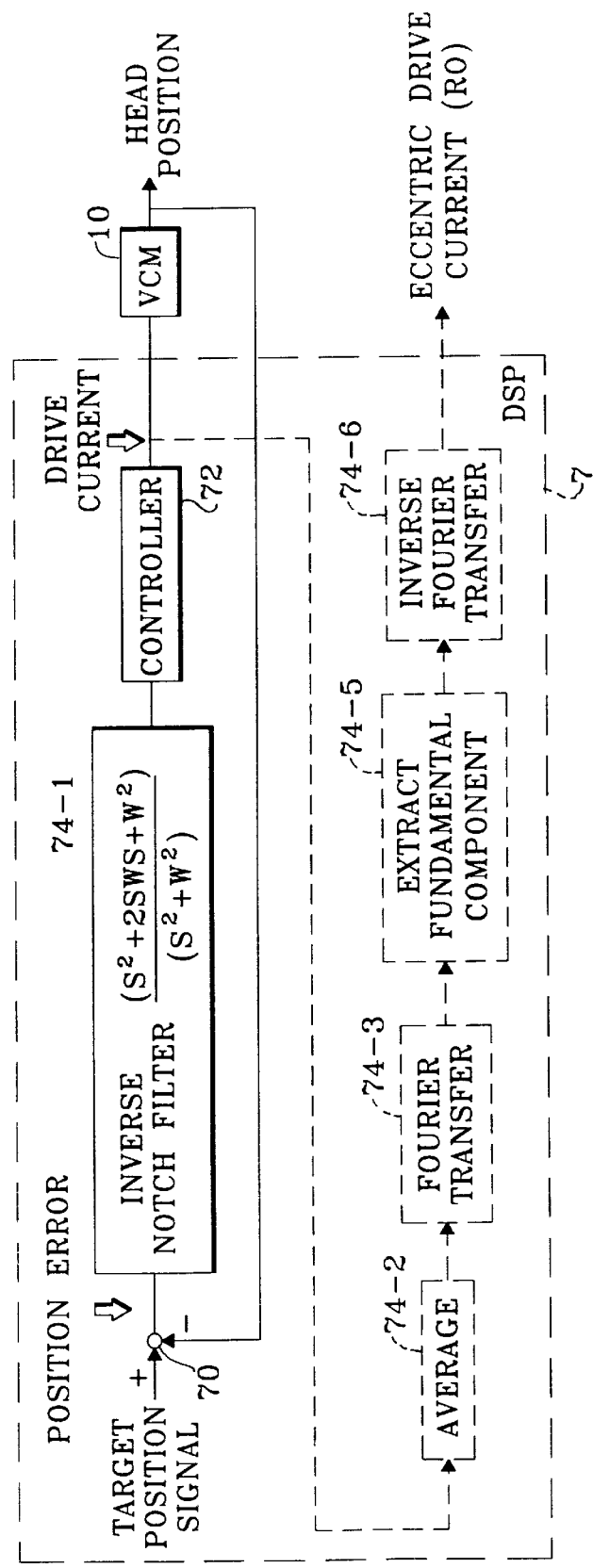
FIG. 6 is a block diagram of the servo circuit for measuring an eccentric deflection.
Figure 7:
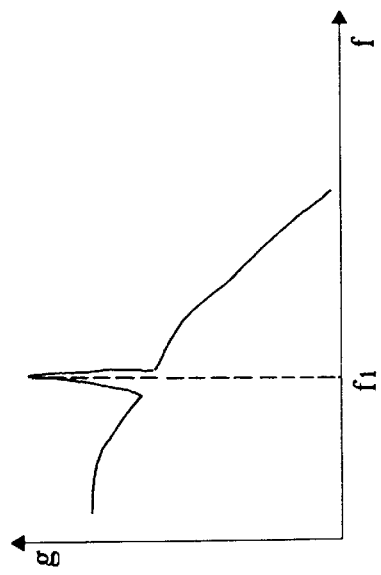
FIG. 7 is a diagram illustrating an inverse notch filter in the servo circuit shown in FIG. 6.

As shown in FIG. 6, an inverse notch filter 74-1 is connected in series to the control processing unit 72. As shown in FIG. 7, the inverse notch filter 74-1 has an open-loop characteristic curve with a high gain g at a frequency (fundamental frequency) f1 at which the magnetic disk 14 rotates. Since the gain of only the fundamental frequency of the positional error is high, the control system follows an eccentricity of the magnetic disk 14.

The DSP 7 has an averaging unit 74-2 which averages a drive current outputted from the control processing unit 72, thereby detecting an eccentric component of the drive current. The DSP 7 also has a Fourier transform unit 74-3 for effecting a Fourier transform on the drive current. If it is assumed that the discrete Fourier transform value of a discrete time function $X(x)$ is represented by $Y(x)$, then the discrete Fourier transform value is expressed by the following equation (1)

$$\operatorname{Re}(Yk) = \sum_{n=0}^{N-1} \{\operatorname{Re}(Xn)\cos(2\pi n/N) - \operatorname{Im}(Xn)\sin(2\pi n/N)\} \quad (1)$$

$$\operatorname{Im}(Yk) = \sum_{n=0}^{N-1} \{\operatorname{Re}(Xn)\sin(2\pi n/N) + \operatorname{Im}(Xn)\cos(2\pi n/N)\}$$

where $\operatorname{Re}(Yk)$ is the real part of the discrete Fourier transform and $\operatorname{Im}(Yk)$ is the imaginary part of the discrete Fourier transform.

A fundamental component extractor 74-5 extracts a fundamental component from the discrete Fourier transform. If it is assumed that the sampling frequency of the control system is represented by Fs, the fundamental frequency by F1, and the number of sectors by N, then the frequency Fk of the discrete Fourier transform Yk is expressed by the following equation (2):

$$Fk = Fs \cdot k/N = k \cdot F1 \quad (2)$$

According to the equation (2), Fk indicates a fundamental frequency or a harmonic frequency. Specifically, when a Fourier transform is effected with the measuring period set to one revolution of the magnetic disk and the number of samples set to the number of sectors, the frequency of each Fourier coefficient is either a fundamental frequency or a harmonic frequency. Therefore, a fundamental component can be extracted by using the Fourier coefficient Y1(Y(1)) of the fundamental frequency F1.

An inverse Fourier transform unit 74-6 effects an inverse Fourier transform on the fundamental component to reproduce the eccentric component (drive current). The inverse Fourier transform is expressed by the following equation (3):

$$\operatorname{Re}(Xk) = -\sum_{n=0}^{N-1} \{\operatorname{Re}(Yn)\cos(-2\pi n/N) - \operatorname{Im}(Yn)\sin(-2\pi n/N)\} \quad (2)$$

$$\operatorname{Im}(Xk) = -\sum_{n=0}^{N-1} \{\operatorname{Re}(Yn)\sin(-2\pi n/N) + \operatorname{Im}(Yn)\cos(-2\pi n/N)\}$$

where $\operatorname{Re}(Xk)$ is the real part of the inverse Fourier transform and $\operatorname{Im}(Xk)$ is the imaginary part of the inverse Fourier transform.

The inverse Fourier transform value of each sample is stored in the first area 81 of the memory 8. The inverse notch filter 74-1, the averaging unit 74-2, the Fourier transform unit 74-3, the fundamental component extractor 74-5, and the inverse Fourier transform unit 74-6, which are represented by respective blocks in FIG. 6, are functions performed by the DSP 7.

The eccentric component is extracted from the drive current by Fourier transform in the manner described above. As the extraction of the fundamental component is performed by Fourier transform, it is not required that the inverse notch filter has a step characteristics.

A process of measuring a high-frequency deviation component will be described below with reference to FIG. 8.

If the control processing unit 72 has a transfer function C and the VCM 10 has a transfer function P, then inverse characteristics of disturbance compression characteristics of the control system is expressed by (1+CP). Therefore, an eccentric component A is expressed by the following equation (4):

$$A = (1 + CP) \times \text{positional error} \quad (4)$$

Since (C×positional error) in the equation (4) represents the drive current, the equation (4) may be modified into the following equation (5):

$$A = \text{positional error} + P \times \text{drive current} \quad (5)$$

The amount of calculations according to the equation (5) is smaller than the equation (4), and the equation (5) suffers a less calculation error due to canceling than the equation (4).

Figure 8:
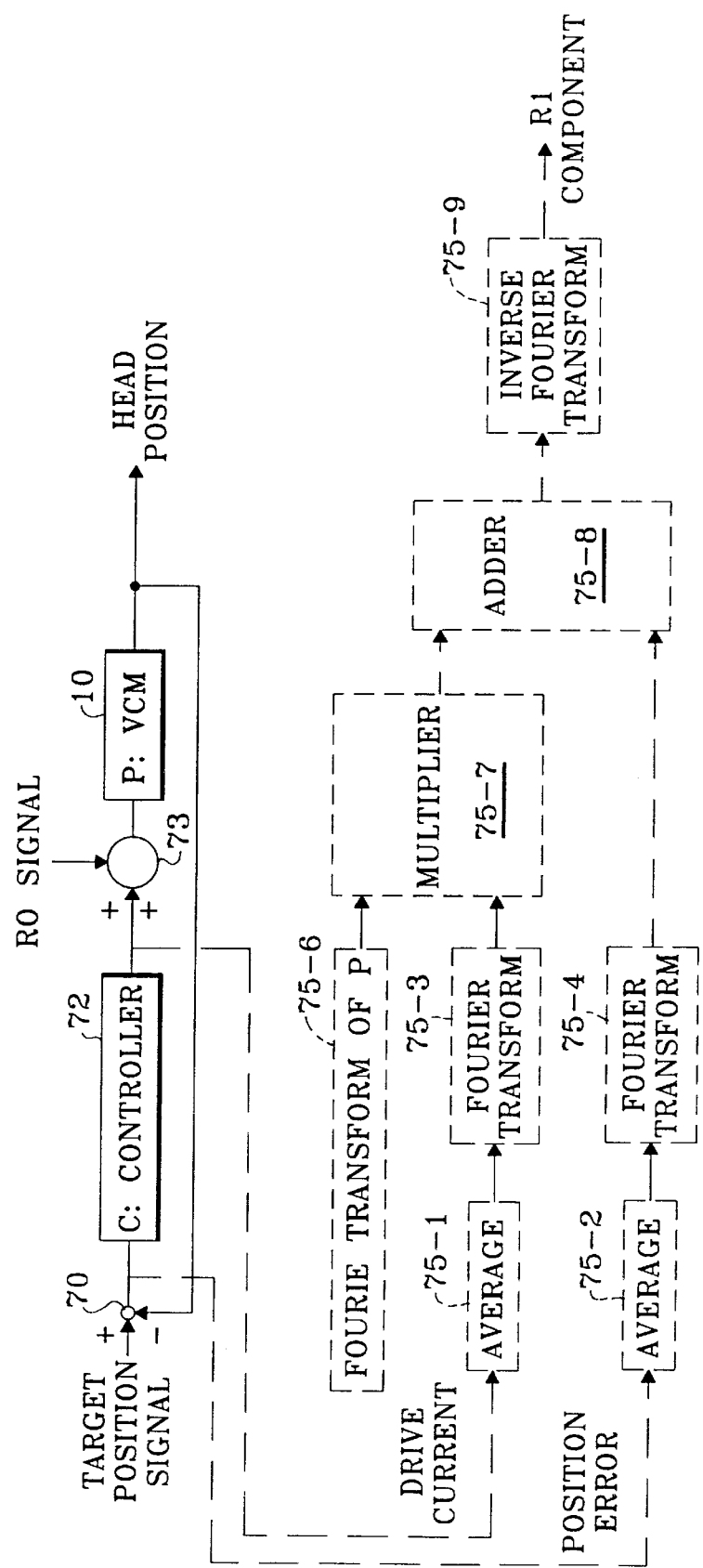
FIG. 8 is a block diagram of a control system for measuring a high-frequency deviation.

As shown in FIG. 8, the control system comprises the first processing unit 70, the control processing unit 72, and the third processing unit 73. The first processing unit 70 calculates a positional error. The control processing unit 72 calculates a drive current from the positional error. The third processing unit 73 adds the eccentric component R0 to the drive current. Therefore, the VCM 10 controls the magnetic head 13 to follow the eccentric component R0.

The DSP 7 has an averaging unit 75-1 which averages the drive current outputted from the control processing unit 72, an averaging unit 75-2 for averaging the positional error outputted from the first processing unit 70, a Fourier transform unit 75-3 for effecting a Fourier transform on the drive current, and a Fourier transform unit 75-4 for effecting a Fourier transform on the positional error.

The DSP 7 also has a Fourier transform unit 75-6 for effecting a Fourier transform on the transfer function (filter function) P of the VCM 10, a multiplier 75-7 for multiplying the Fourier transform value of the drive current by the Fourier transform value of the transfer function, an adder 75-8 for adding the Fourier transform value of the positional error and the product from the multiplier 75-7 to each other, and an inverse Fourier transform unit 75-9 for effecting an inverse Fourier transform on the sum from the adder 75-8 thereby to reproduce the high-frequency deviation component (positional error) R1.

The inverse Fourier transform value of each sample is stored in the second area 82 of the memory 8. The averaging units 75-1, 75-2, the Fourier transform units 75-3, 75-4, 75-6, the multiplier 75-7, the adder 75-8, and the inverse Fourier transform unit 75-9, which are represented by respective blocks in FIG. 8, are functions performed by the DSP 7.

The high-frequency deviation component is extracted from the drive current and the positional error by the Fourier transform in the manner described above. Since the high-frequency deviation component is measured while following the eccentric component, the high-frequency deviation component can be measured without being affected by the eccentric component. Because a high-order deviation component is measured using an inverse model of the control system, the high-order deviation component can be extracted by calculations.

Moreover, no initial value of the transfer function is necessary and a transient response is minimized as the Fourier transform is effected. Accordingly, the high-order deviation component can be measured accurately.

While the high-order deviation component is measured according to the above equation (5), it may be measured using the equation (4).

Figure 9A:
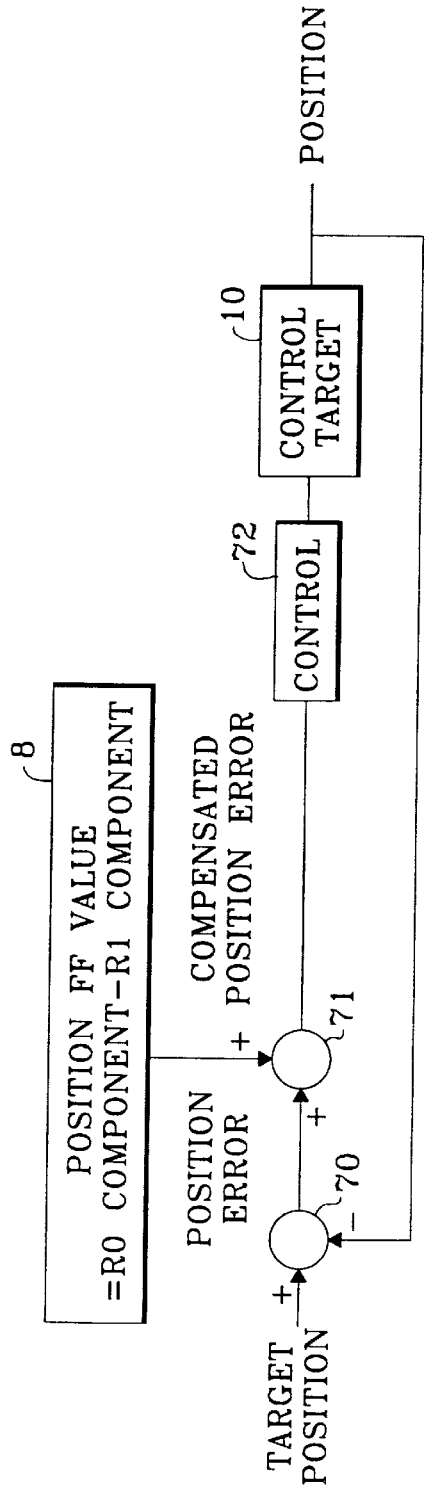
FIGS. 9A and 9B are block diagrams of control systems according to other embodiments of the present invention.
Figure 9B:
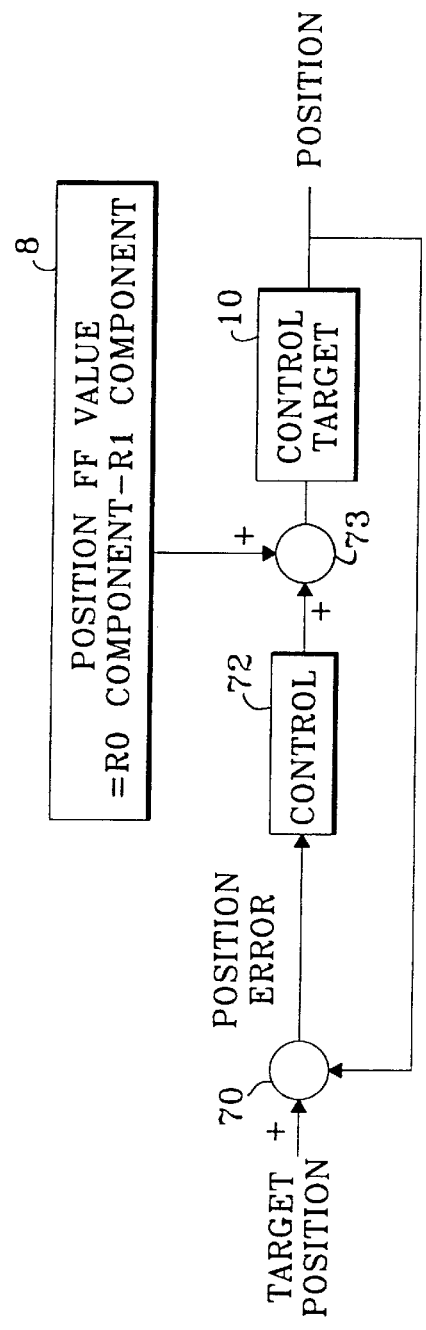

FIGS. 9A and 9B show in block form control systems according to other embodiments of the present invention.

In the control system shown in FIG. 9A, the memory 8 stores a position feedforward value produced by subtracting the high-frequency deviation component R1 from the eccentric component R0. The second processing unit 71 adds the position feedforward value stored in the memory 8 to the positional error produced by the first processing unit 70. The control processing unit 72 converts the corrected positional error into a drive current.

In the control system shown in FIG. 9B, the memory 8 stores a current feedforward value produced by subtracting the high-frequency deviation component R1 from the eccentric component R0. The third processing unit 73 adds the current feedforward value stored in the memory 8 to the drive current produced by the control processing unit 72.

The control systems shown in FIGS. 9A and 9B are also capable of controlling the position of the magnetic head 13 while following the eccentric component and eliminating the high-order deviation component.

Figure 10A:
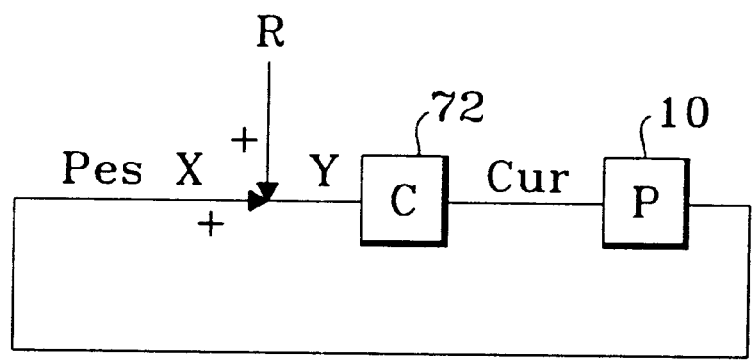
FIGS. 10A and 10B are block diagrams of control systems for measuring frequencies according to the present invention.
Figure 10B:
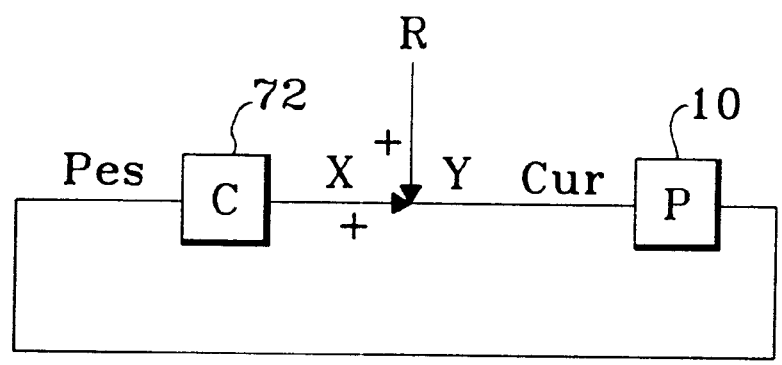

The DSP is capable of measuring frequency characteristics of the control system. FIGS. 10A and 10B show in block form control systems for measuring frequencies according to the present invention.

In FIGS. 10A and 10B, the transfer function of the control processing unit 72 is represented by C and the transfer function (mechanical characteristics) of the VCM 10 is represented by P. The control processing unit 72 and the VCM (to be controlled) 10 jointly make up a control system. The control processing unit 72 converts a positional error Pes into a drive current Cur. The positional error Pes of the VCM 10 is applied to the control processing unit 72.

A measuring noise R is added to the control system. In FIG. 10A, the measuring noise R is added to the position. In FIG. 10B, the measuring noise R is added to the current.

Frequency characteristics of the control system are measured by adding the measuring noise to the control system, reading waveforms generated when the measuring noise is added to the control system, effecting a Fourier transform on the waveforms to calculate complex Fourier coefficients, and determining frequency characteristics from the complex Fourier coefficients.

Mechanical characteristics P, open-loop characteristics Z1, closed-loop characteristics Z2, and disturbance compression characteristics Z3 are determined from the waveforms R, X, Y, Pes, Cur according to the following equations:

$$P = Pes/Cur$$

$$Z1 = Y/x$$

$$Z2 = Y/R$$

$$Z3 = X/R$$

Figure 11A:
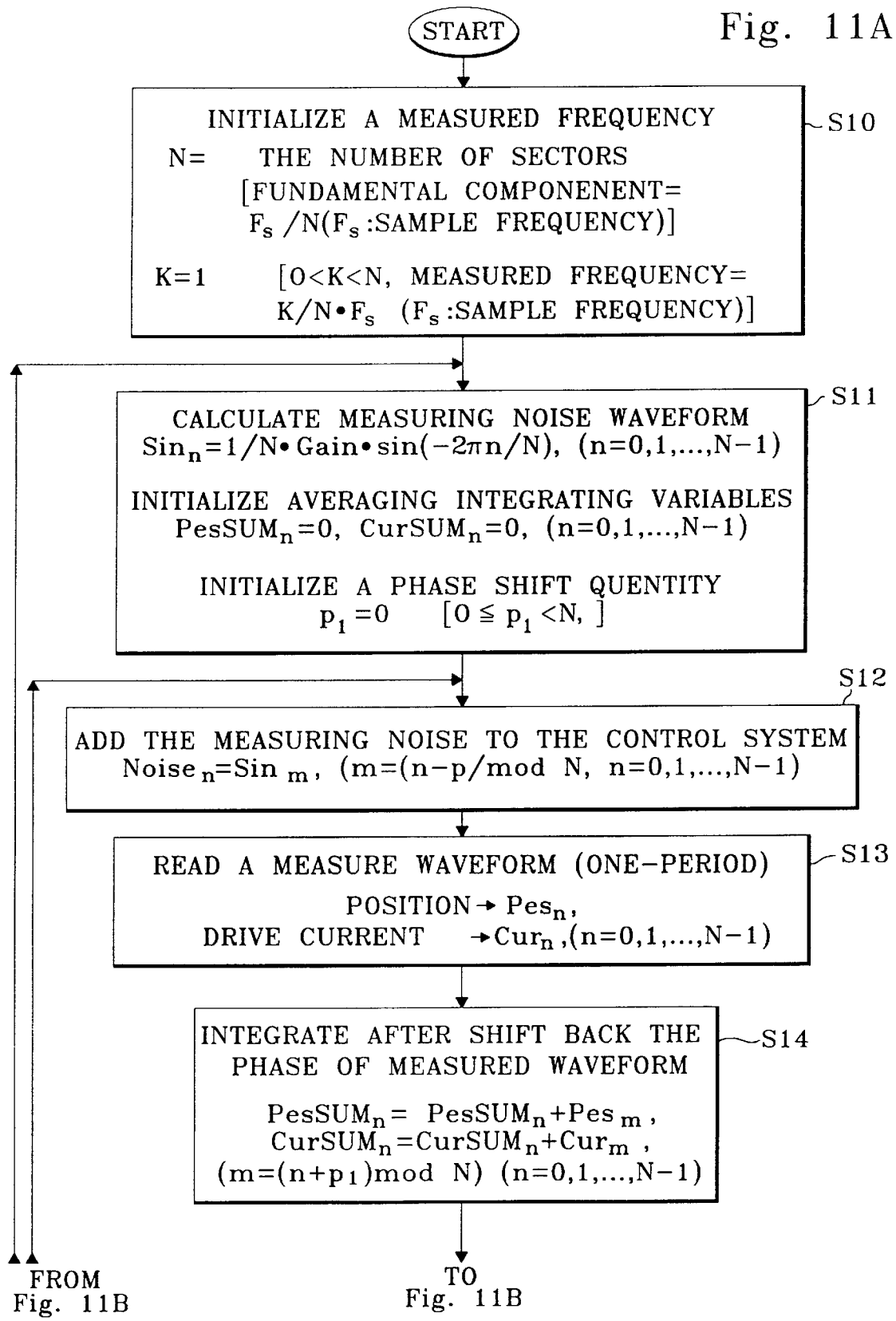
FIG. 11 is a flowchart of a process for removing an off-center component and a high-order deviation from measured frequencies.
Figure 11B:
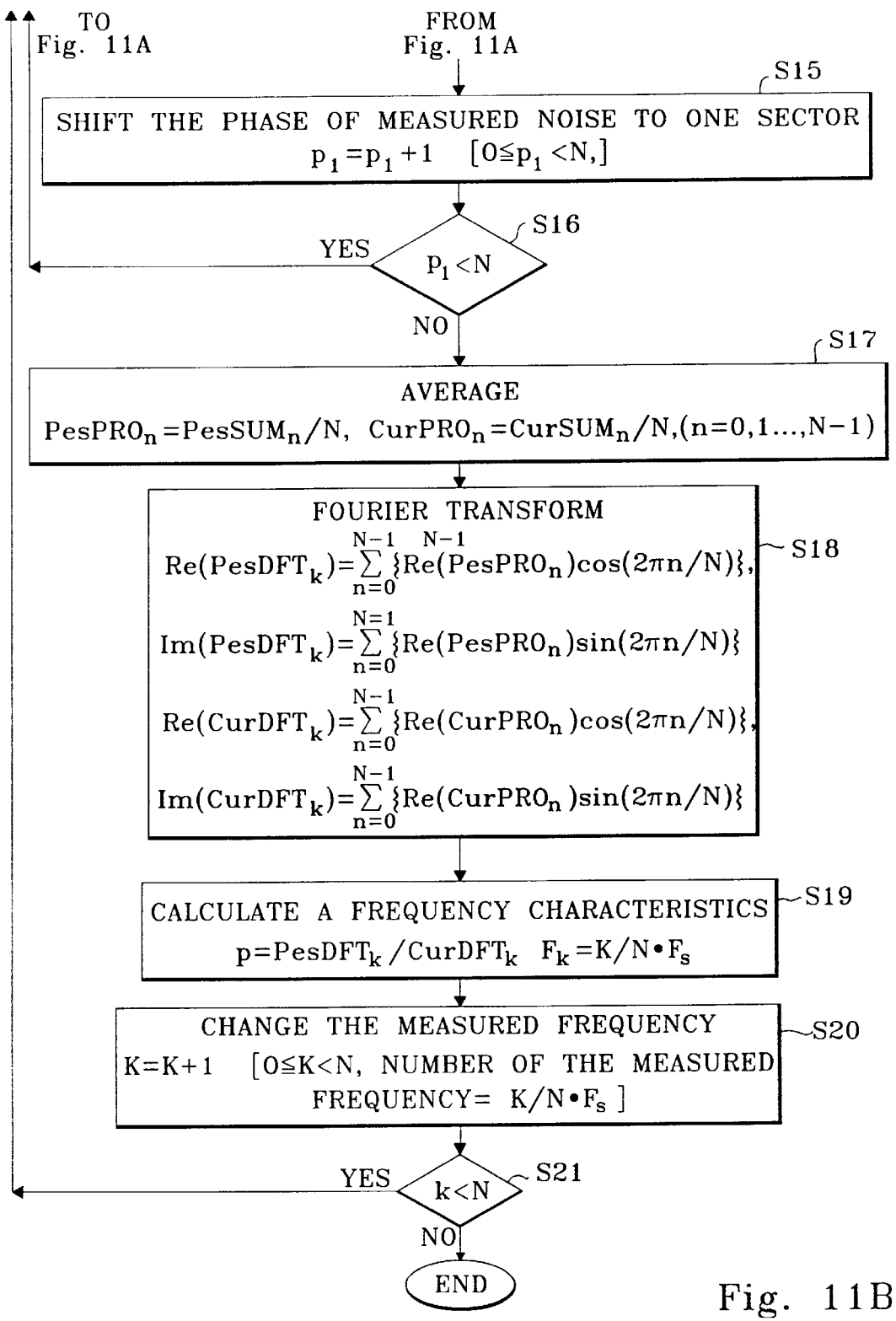

If there are an eccentric component and a high-order deviation at this time, they will be contained in measured results, reducing the accuracy thereof. In order to increase the accuracy of the measured results, it is necessary to remove the eccentric component and the high-order deviation from the measured results. FIG. 11 shows a process for removing an eccentric component and a high-order deviation from measured frequencies. In FIG. 11, reference numerals with a prefix S represent step numbers.

(S10) A measured frequency is initialized. Specifically, a parameter N is set to the number of sectors, and a frequency parameter k is set to "1".

Figure 12A:
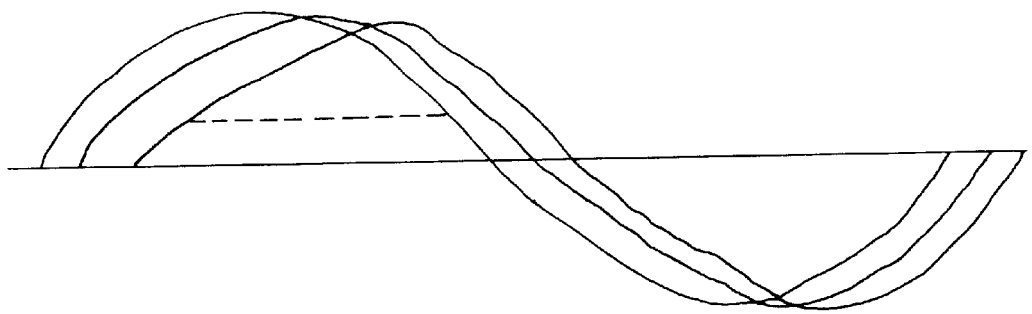
FIGS. 12A and 12B are diagrams illustrative of the process shown in FIG. 11.

(S11) An nth measuring noise waveform Sn, which is a sine waveform as shown in FIG. 12A, is calculated according to the following equation:

$$Sn = 1/N \cdot G \cdot \sin(-2n/N)$$

where G represents an amplitude to be added to the control system.

Then, averaging integrating variables PesSUMn, CurSUMn are initialized to "0", and a phase shift quantity P1 of the measuring noise is initialized to "0".

(S12) The measuring noise is shifted in phase and added to the control system. An nth noise waveform Nn to be added is an mth noise waveform Sm where m=n−P1.

(S13) A measured waveform over one period is read. Specifically, a position PESn and a drive current CURn are read.

(S14) The phase of the measured waveform is shifted back and integrated. Specifically, an mth measured position PESm is added to an nth position integrating variable PesSUMn to update the nth position integrating variable PesSUMn, and an mth measured current CURm is added to an nth current integrating variable CurSUMn to update the nth current integrating variable CurSUMn.

(S15) The phase shift quantity P1 of the measuring noise is shifted by one sector. That is, the phase shift quantity P1 is updated to a phase shift quantity (P1+1).

(S16) It is determined whether the phase shift quantity P1 is smaller than the number N of sectors or not. If the phase shift quantity P1 is smaller than the number N of sectors, then control goes back to the step S12.

(S17) If the phase shift quantity P1 is equal to or greater than the number N of sectors, then the measurement with all phase shift quantities is completed at the frequency. The measured waveforms are averaged.

Specifically, an average measured position PesPROn is determined according to PesSUMn/N, and an average measured current CurPROn is determined according to CurSUMn/N.

(S18) The measured waveform is subjected to a Fourier transform. Specifically, a real part Re(PesDFTk) and an imaginary part Im(PesDFTk) of a Fourier coefficient of the measured position are determined from the average measured position PesPROn. Similarly, a real part Re(CurDFTk) and an imaginary part Im(CurDFTk) of a Fourier coefficient of the measured current are determined from the average measured current CurPROn. The Fourier transform to be determined is of the measured frequency only.

(S19) Frequency characteristics are determined in a complex form. Specifically, the mechanical characteristics P are obtained as a value produced by dividing the Fourier coefficient PesDFTk of the position by the Fourier coefficient CurDFTk of the current. The measured frequency Fk at this time is indicated by K/N·Fs where Fs represents the sampling frequency.

(S20) A measured frequency variable k is changed. That is, the measured frequency variable k is updated to a measured frequency variable (k+1).

(S21) The measured frequency variable k and the number N of sectors are compared with each other. If the measured frequency variable k is smaller than the number N of sectors, then control goes back to the step S11. If the measured frequency variable k is equal to or greater than the number N of sectors, then the measurement of all frequencies is finished. The process shown in FIG. 11 now comes to an end.

Figure 12B:
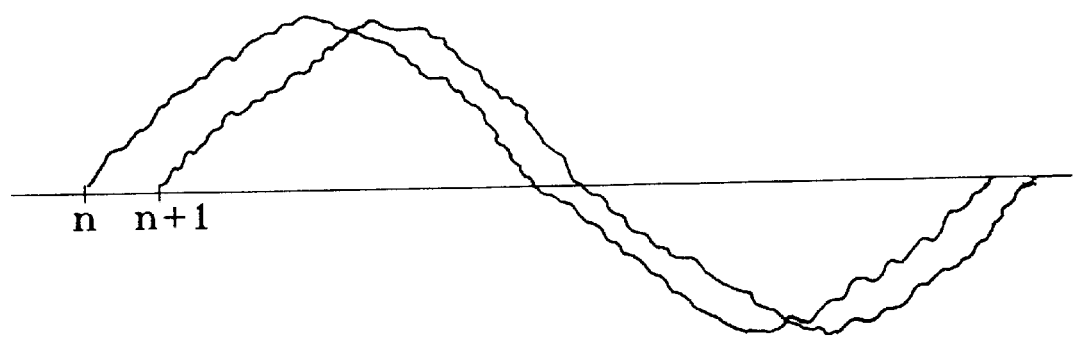
Figure 13:
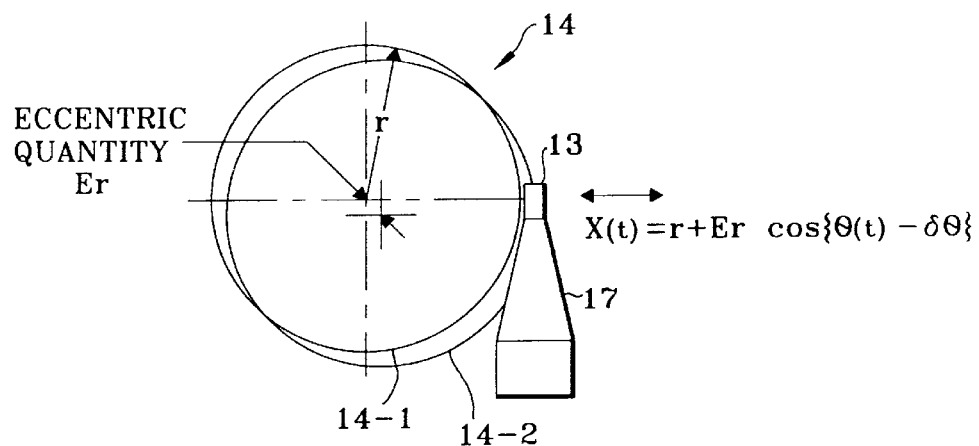
FIG. 13 is a diagram illustrating how a servo track deflects to an eccentric position with respect to a circular pattern around the axis of rotation of a magnetic disk.
Figure 14:
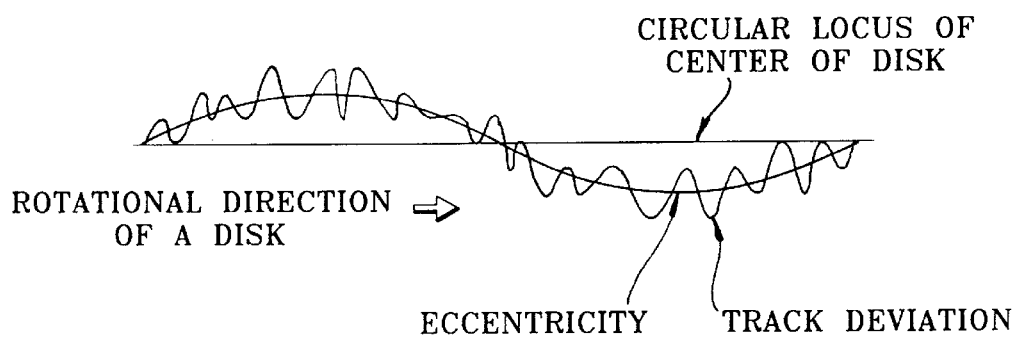
FIG. 14 is a diagram which illustrates the manner in which a track deviates from a circular pattern on a magnetic disk.
Figure 15:
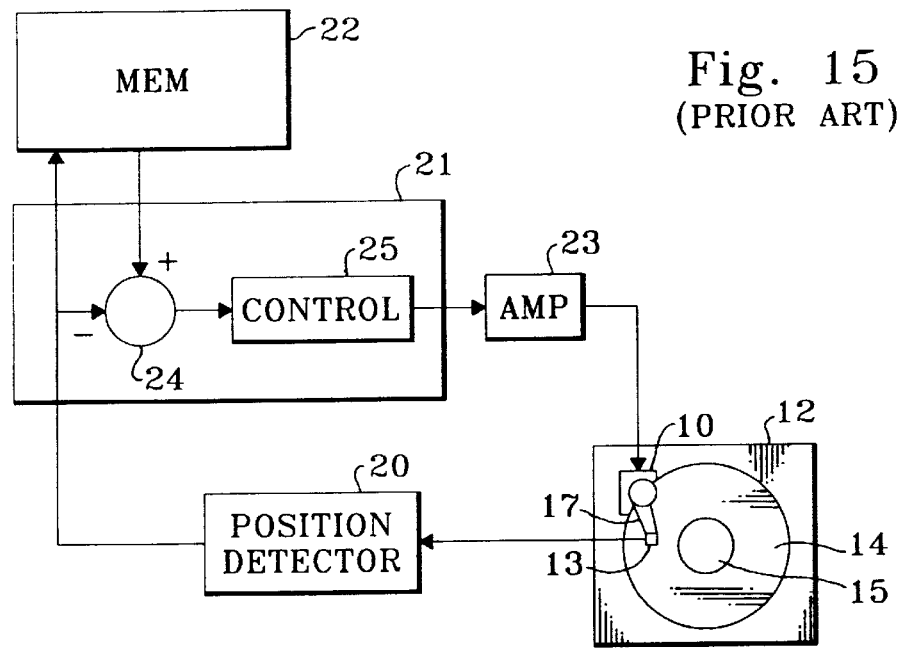
FIG. 15 is a plan view, partly in block form, of a conventional magnetic disk drive for controlling the position of a magnetic head.
Figure 16:
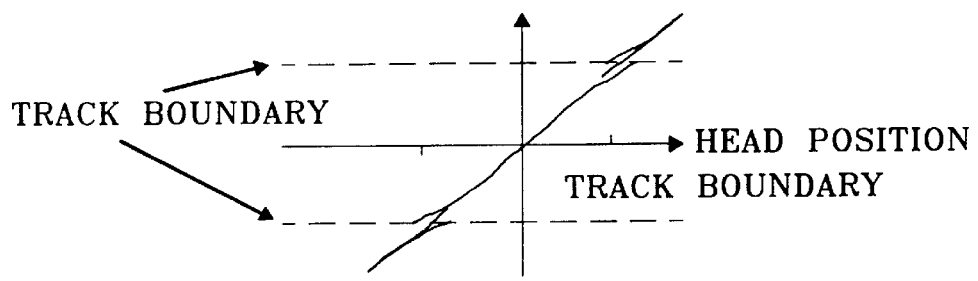
FIG. 16 is a diagram illustrating a problem with a conventional eccentric control process.
Figure 17:
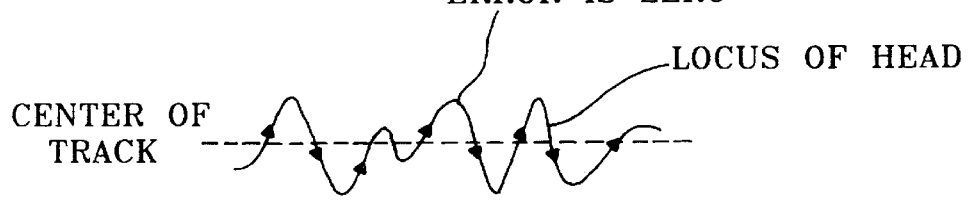
FIG. 17 is a diagram illustrating a problem with the conventional eccentric control process.

As shown in FIG. 12A, a sine wave is used as the measuring noise wave. Specifically, sine waves produced by successively shifting the sine wave in phase are applied as noise to the control system. Measured waves obtained when these sine waves are applied are shown in FIG. 12B. When the measured waves are superimposed, the component of the sine wave, i.e., the eccentric component and the deviation component of the magnetic disk are eliminated. Stated otherwise, after the measuring noise wave is successively shifted in phase and added to the control system, a measured waveform is added to the measured waveform obtained before the measuring noise wave is shifted. In this fashion, it is possible to measure frequency characteristics free of eccentric component and the deviation component of the magnetic disk.

The present invention may be modified as follows:

(1) An eccentric component and a high-frequency deviation component may be measured separately from each other by any of various other processes than the illustrated processes.

(2) While an eccentric component has been described as being measured by the control system shown in FIG. 6, it may be measured by the control system shown in FIG. 8.

The present invention offers the following advantages:

(1) Since the magnetic head is controlled so as to follow a rotational frequency component, i.e., the frequency at which the magnetic disk rotates, the eccentricity of the magnetic disk can accurately be compensated for. Because the magnetic head is controlled while eliminating a high-order frequency component at a discontinuous region of a servo demodulation displacement, the magnetic head is prevented from vibrating at a track boundary.

(2) Inasmuch as a rotational frequency component and a high-order frequency component are measured separately from each other, the magnetic head can be controlled to follow the rotational frequency component accurately while eliminating the high-order frequency component. Therefore, the magnetic head can be controlled to follow the eccentricity of the magnetic disk with high positioning accuracy.

Although certain preferred embodiments of the present invention have been shown and described in detail, it should be understood that various changes and modifications may be made therein without departing from the scope of the appended claims.

What is claimed is:

1. A method of positionally controlling a recording/reproducing head in a disk device having a recording/reproducing head for reading information from a recording disk carrying servo information and rotatable about an axis positioning means for positioning the recording/reproducing head radially over the recording disk, and control means for controlling the positioning means according to the servo information, said method comprising the steps of:

(a) separately measuring a rotational frequency component of the recording disk and a high-order frequency component which has frequencies higher than said rotational frequency component; and (b) feed-back controlling said positioning means by a positional error generated from said servo information while feed-forward controlling said positioning means so as to follow said rotational frequency component and to eliminate said high-order frequency component.

2. A method according to claim 1, wherein said step (a) comprising the steps of:

(c) measuring said rotational frequency component of the recording disk based on a signal read by said recording/reproducing head; and (d) measuring said high-order frequency component based on a signal read by said recording/reproducing head.

3. A method according to claim 2, wherein said step (d) comprises the step of:

(e) measuring said high-order frequency component while controlling said positioning means to follow said rotational frequency component measured in said step (a).

4. A method according to claim 2, wherein said step (c) comprises the step of:

(f) measuring said rotational frequency component from a control current produced by said control means.

5. A method according to claim 4, wherein said step (c) comprises the steps of:

(g) extracting said rotational frequency component from a positional error with an inverse notch filter; and (h) converting the extracted rotational frequency component into the control current and measuring said rotational frequency component from said control current.

6. A disk apparatus comprising:

a recording/reproducing head for reading information from a recording disk storing servo information;

positioning means for positioning the recording/reproducing head radially over the recording disk; and control means for controlling the positioning means according to the servo information;

said control means comprising means for separately measuring a rotational frequency component of the recording disk and a high-order frequency component which has frequencies higher than said rotational frequency component, and thereafter feed-back controlling said positioning means by a positional error generated from said servo information while feed-forward controlling said positioning means so as to follow said rotational frequency component and to eliminate said high-order frequency component.

7. A disk apparatus according to claim 6, wherein said control means comprises means for measuring said rotational frequency component of the recording disk based on a signal read by said recording/reproducing head, and thereafter measuring said high-order frequency component based on a signal read by said recording/reproducing head.

8. A disk apparatus according to claim 7, wherein said control means measure said high-order frequency component while controlling said positioning means to follow the measured rotational frequency component.

9. A disk apparatus according to claim 7, wherein said control means measure said rotational frequency component from a control current produced by said control means.

10. A disk apparatus according to claim 9, wherein said control means extract said rotational frequency component from a positional error with an inverse notch filter, and thereafter measure said rotational frequency component from said control current in which the extracted rotational frequency component is compressed.

11. A method of positionally controlling a recording/reproducing head in a disk device having a recording/reproducing head for reading information from a recording disk carrying servo information and rotatable about a axis, positioning means for positioning the recording/reproducing head radially over the recording disk, and control means for controlling the positioning means according to the servo information, said method comprising the steps of:
(a)(i) measuring a positional error signal based on a signal read by said recording/reproducing head;
(a)(ii) extracting a rotational frequency component from said positional error signal with an inverse notch filter, and converting said rotational frequency component into a control current;
(a)(iii) performing a discrete Fourier transform on said control current to produce a discrete Fourier transform value thereof;
(a)(iv) generating a rotational frequency component by effecting an inverse Fourier transform on said discrete Fourier transform value;
(b) measuring a high-order frequency component which has frequencies higher than said rotational frequency component based on said signal read by said recording/reproducing head; and
(c) feed-back controlling said positioning means using said positional error signal while feed-forward controlling said positioning means so as to follow said rotational frequency component and to eliminate said high-order frequency component.

12. A method of positionally controlling a recording/reproducing head in a disk device having a recording/reproducing head for reading information from a recording disk carrying servo information and rotatable about a axis, positioning means for positioning the recording/reproducing head radially over the recording disk, and control means for controlling the positioning means according to the servo information, said method comprising the steps of:
(a)(i) measuring a positional error signal based on a signal read by said recording/reproducing head;
(a)(ii) generating a rotational frequency component by multiplying said positional error signal by an inverse model of a control system;
(b) measuring a high-order frequency component which has frequencies higher than said rotational frequency component based on said signal read by said recording/reproducing head while controlling the positioning means to follow said rotational frequency component; and
(c) feed-back controlling said positioning means using said positional error while feed-forward controlling said positioning means so as to follow said rotational frequency component and to eliminate said high-order frequency component.

13. A method according to claim 12, wherein said high-order frequency component is determined using:
said positional error signal and a control current produced by the control means.

14. A method according to claim 13, wherein said high-order frequency component is determined by multiplying said control current by a transfer function of said positioning means to produce a product, and thereafter adding said positional error signal to said product to determine said high-order frequency component.

15. A method according to claim 13, wherein said high-order frequency component is determined by:
effecting a Fourier transform on said positional error to produce a Fourier transform value (x) thereof, effecting a Fourier transform on said control current to produce a Fourier transform value (y) thereof and effecting a Fourier transform on said transfer function of said positioning means to produce a Fourier transform value (z) thereof;
multiplying said Fourier transform value (x) by said Fourier transform value (z) means to produce a product
adding said Fourier transform value (y) to said product to produce a sum; and
effecting an inverse Fourier transform on said sum.

16. A disk apparatus comprising:
a recording/reproducing head for reading information from a recording disk storing servo information;
positioning means for positioning the recording/reproducing head radially over the recording disk; and
control means for controlling the positioning means according to the servo information;
said control means comprising means for separately measuring a rotational frequency component of the recording disk and a high-order frequency component which has frequencies higher than said rotational frequency component based on the information read by said recording/reproducing head, and thereafter feed-back controlling said positioning means by a positional error generated from said servo information while feed-forward controlling said positioning means so as to follow said rotational frequency component and to eliminate said high-order frequency component;
wherein said control means extracts a rotational frequency component from said positional error signal with an inverse notch filter, and converts said rotational frequency component into a control current;
wherein said control means effects a Fourier transform on said control current to produce a discrete Fourier transform value thereof and effects an inverse Fourier transform on said rotational frequency component in the discrete Fourier transform value.

17. A disk apparatus comprising:
a recording/reproducing head for reading information from a recording disk storing servo information;
positioning means for positioning the recording/reproducing head radially over the recording disk; and
control means for controlling the positioning means according to the servo information;
said control means comprising means for separately measuring a rotational frequency component of the recording disk and a high-order frequency component which has frequencies higher than said rotational frequency component based on the information read by said recording/reproducing head, and thereafter feed-back controlling said positioning means by a positional error generated from said servo information while feed-forward controlling said positioning means so as to follow said rotational frequency component and to eliminate said high-order frequency component;

wherein said control means multiplies said positional error signal by an inverse model of a control system to measure said high-order frequency component.

18. A disk apparatus according to claim 17, wherein said control means measure said high-order frequency component from said positional error and a control current produced by said control means.

19. A disk apparatus according to claim 18, wherein said control means effect a Fourier transform on said positional error to produce a Fourier transform value (x) thereof, effect a Fourier transform on said control current to produce a Fourier transform value thereof, effect a Fourier transform on said transfer function of said positioning means to produce a Fourier transform value (z) thereof, multiplying said Fourier transform value (x) by said Fourier transform value (z) means to produce a product, add said Fourier transform value (y) to said product to produce a sum, and effect an inverse Fourier transform on said sum.

* * * * *